United States Patent
Wilhelm

[15] 3,657,990
[45] Apr. 25, 1972

[54] WASHER FOR SHEETS OF PHOTOGRAPHIC MATERIAL

[72] Inventor: Henry G. Wilhelm, 1408 East Street, Grinnel, Iowa 50112

[22] Filed: Oct. 24, 1969

[21] Appl. No.: 869,240

[52] U.S. Cl. ....................................................95/98
[51] Int. Cl. .................................................G03d 3/02
[58] Field of Search ........................95/96, 97, 98, 100

[56] References Cited

UNITED STATES PATENTS

| | | | |
|---|---|---|---|
| 1,526,179 | 2/1925 | Parr et al. | 68/183 UX |
| 2,873,600 | 2/1959 | Demaret | 68/183 |
| 3,293,890 | 12/1966 | Valdespino et al. | 68/183 X |
| 1,035,540 | 8/1912 | Creech | 95/97 |
| 1,197,533 | 9/1916 | Norton | 95/97 |
| 1,661,378 | 3/1928 | McKellan | 95/98 X |
| 2,120,706 | 6/1938 | Lynch | 95/98 X |
| 2,638,829 | 5/1953 | Singer | 95/100 |
| 2,902,914 | 9/1959 | Dye et al. | 95/97 |
| 3,005,396 | 10/1961 | Keller | 95/100 |
| 3,259,049 | 7/1966 | Uithoven | 95/100 |
| 3,379,114 | 4/1968 | Joseph | 95/97 |

Primary Examiner—Samuel S. Matthews
Assistant Examiner—Richard M. Sheer
Attorney—Max L. Libman

[57] ABSTRACT

A washer for photographic sheet material, such as prints or films, in the form of a tank having a fluid inlet near the bottom including an aerator for introducing a mixture of fine bubbles and water into a horizontal distribution manifold at the bottom of the tank, the top of said manifold being a horizontal septum perforated throughout its area with small perforations and the aerator having a vertical air inlet tube extending from the fluid inlet to above the overflow level of the tank. In addition, the print washer form of the device has a number of parallel compartments for holding individual sheets and so arranged that there can be no fluid contamination between compartments.

8 Claims, 14 Drawing Figures

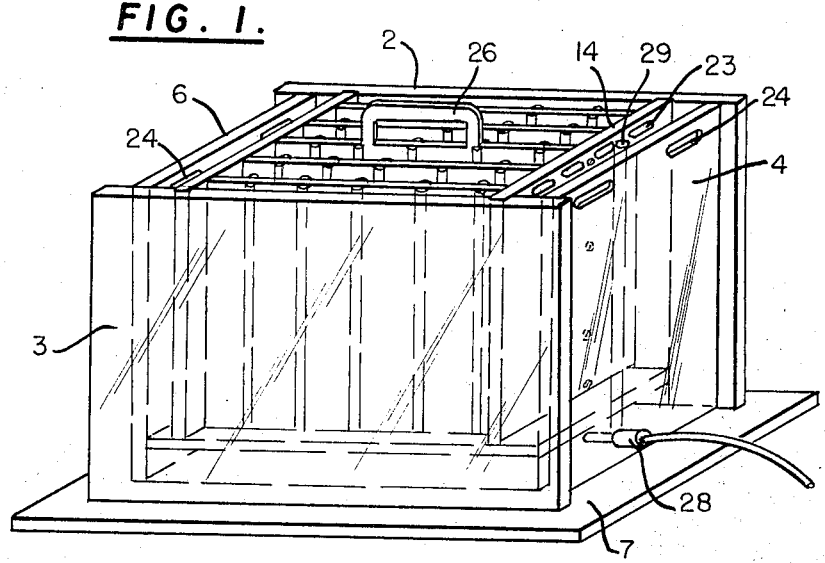
FIG. 1.
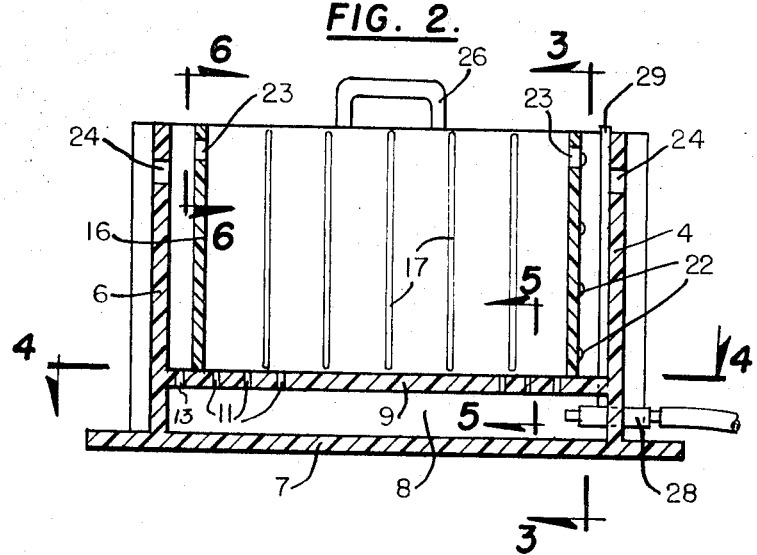
FIG. 2.
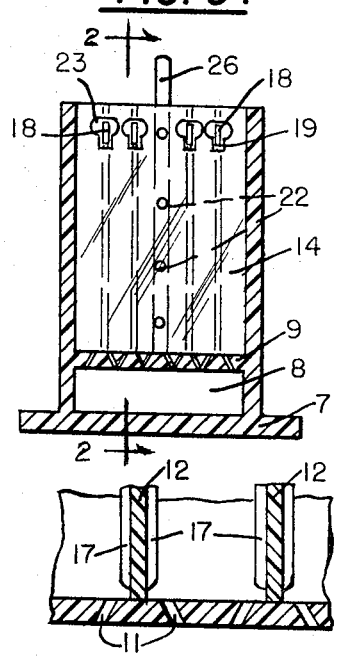
FIG. 3.
FIG. 5.
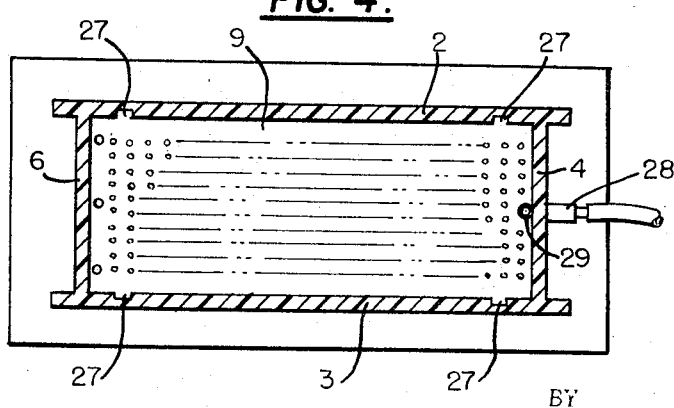
FIG. 4.
INVENTOR
Henry G. Wilhelm
ATTORNEY

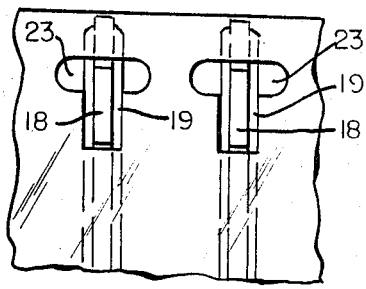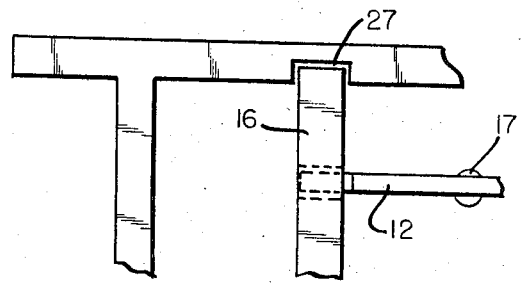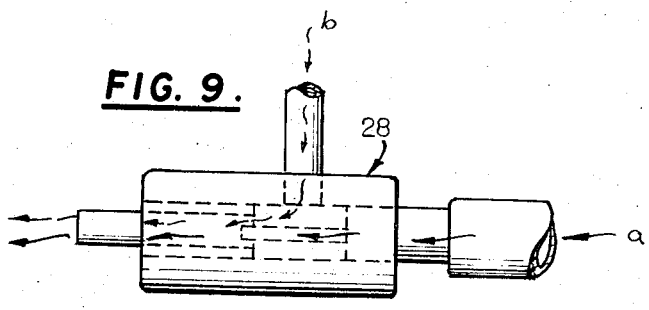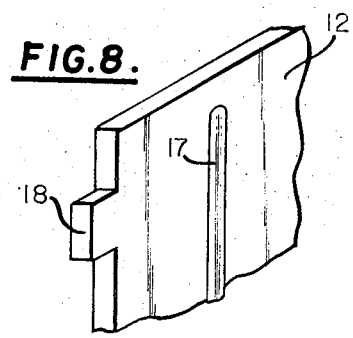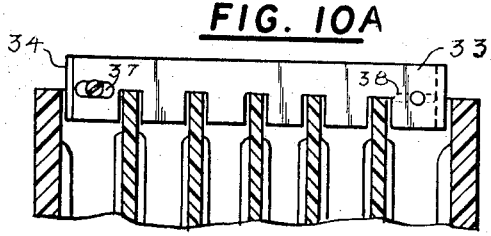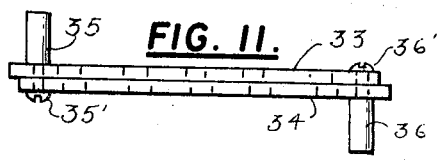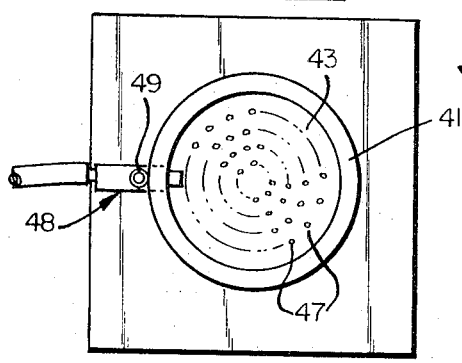

WASHER FOR SHEETS OF PHOTOGRAPHIC MATERIAL

This improvement is especially designed for washing sheets of flexible photographic paper and film. As is well known in photographic science, all residual thiosulfate and other chemicals used in the development, fixing and toning of photographs must be removed from the photographic emulsion and its support base if the image is to remain free of stain and/or fading over long periods of time. Thorough washing requires that the photographic material be subjected to a constant flow of water coming into contact with all surface areas of the sheet for sufficient periods of time so that residual chemicals diffuse and are carried away from the photographic emulsion and its support base.

Heretofore most washers designed to wash paper photographic prints have had no provision for insuring the separation of one print from another which is necessary if a constant flow of clean water is to reach all areas of the print. All previous washers have suffered from having one common tank of water so that when a print or film fresh from the processing chemical baths is inserted into the washer it re-contaminates all the prints or films already in the washer. Furthermore, most previous print washers attempt to move the prints about by some physical means in an effort to separate the prints from each other from time to time. This movement often results in damaged corners of the prints or abraded emulsions, especially with large-size prints. Attempts to separate prints by physical means, such as high velocity water jets, rotating drums etc. have generally been ineffectual with large-size prints and have generally resulted in uneven or incomplete washing of the prints. Furthermore, most previous print washers hold a relatively large amount of water at any given time which requires a large volume of water flow and long periods of time for the chemicals diffused from the prints to be diluted to a safe level. Furthermore, most previous print washers wash prints in a horizontal position which, for large-size prints, requires that the washer occupy a large area of space. Furthermore, most previous print washers allow prints to float on the surface of the water when the washer is not in operation. This often leads to partial drying of areas of the prints which can cause stains of various sorts and/or may cause the prints to stick together. This means that prints should be removed from such washers soon after washing is completed — which places limits on the automatic operation of such washers.

In the present improvement the sheets of photographic material are washed in a vertical tank which is separated into separate compartments by solid partitions. Each compartment has an independent water input and outlet system, thereby making each compartment operate without the water in it intermixing with the water in other compartments. This feature prevents recontamination of previously inserted sheets of photographic material when a fresh chemical-laden sheet is inserted into the washer.

Various size sheets of photographic material may be inserted into a compartment and washed without the aid of any hanger or other sheet holding apparatus. However, especially in the case of photographic films, the operator may want to utilize one of the various types of hangers in common use in photographic processing to hold the films while they are being washed in the washer. Use of most such hangers requires no modification of the washer.

It is intended that for maximum washing efficiency only one sheet of photographic material be inserted into each compartment, though of course, two or more smaller sizes may be placed side-by-side in a compartment as long as they do not overlap each other. Some types of photographic material, with non-absorbing backings, permit two sheets to be placed in each compartment back-to-back so that the emulsion sides face out and are exposed to the water flow. Some users will of course insert more than the ideal number of sheets in each compartment; however the efficiency of the washing action will be greatly impaired.

The washer preferably incorporates an aeration system which adds quantities of air bubbles to the input water stream using well known principles of aeration with the improvement of an air intake tube, the opening of which is above the water level of the operating washer. Having the air intake at this point prevents the washer from draining itself through the aerator air intakes when the water supply is cut off, at which time the air intake tube fills with water to the level of the water in the tank. When the water input supply is turned on, the vacuum formed in the aerator sucks the water out of the air intake tube and the aerator again aerates the water input stream.

The air/water mixture is distributed evenly into the various washing compartments by a distribution manifold which contains a number of holes spaced over the length of the bottom of each compartment. When the washer is operating there is a higher pressure in the manifold than in the washing compartments which prevents contaminated water from leaving one compartment and traveling into another compartment by way of the manifold. The air bubbles serve two functions: they provide a high degree of agitation of the water in each compartment in constantly varying patterns, and the bubbles tend to keep the sheets of photographic material free from the partitions forming the compartments, thus allowing the water to circulate freely on both sides of the sheet.

As can be seen from the drawings, the air/water mixture enters the bottom of the washer, is distributed to the various compartments through the distribution manifold, then rises up on both sides of the sheet of photographic material, and then leaves the washer somewhat below the top through drainage openings on one or both ends of the tank. The sides of the tank and the compartment partitions are so constructed as to extend above the operating water level of the washer, thus preventing water from one compartment intermixing with water in another compartment. An alternate design would of course allow for the ends of the tank to end at the desired drainage level, thus eliminating the need for drainage openings. However, this arrangement would leave the top corners of the compartment partitions exposed, and might cause injury to the operator if he should accidentally strike the corners.

The interior of the sides of the tank facing the sheets as well as both sides of the compartment partitions have a series of ribs or other protrusions which will serve to help keep the sheets of photographic material free of the sides or partitions, thus affording water circulation on both sides of the sheets. In the case of vertical ribs the distribution manifold has at least one input hole directed at each side of the sheet within each area enclosed by the ribs, that is, the area between each two ribs. This arrangement will prevent the formation of "dead water" areas which might occur in the event that the sheet of photographic material should press up against the ribs. The ribs should ideally have a cross section shape of a triangle, with the protruding corner somewhat rounded so as not to abrade the sheet of photographic material. One side of the triangle can form a flat surface area which lends itself to being attached to the partitions or sides of the tank by gluing, welding, or other adhesion process. An alternative form may be rounded surface protrusions evenly spaced over the surface of the partitions and sides of the tank. The ribs or rounded protrusions would lend themselves to manufacture by casting in plastic or other material or stamping or otherwise forming out of stainless steel or other material.

The print washer of the invention is made in two basic designs, which hereafter shall be referred to as the "standard" model and the "easy-unload" model. The difference between the two models is as follows. The standard model has the compartment partitions held in place by grooves cut into the opposing ends of the washer tank. The partitions are generally left in place, thus affording separate compartments which prevent the flow of water from one compartment to another. The partitions may in fact be attached permanently by welding or other means; however, it is desirable that the partitions be removable at such times as may be desired so that they may be cleaned of water slime or other deposits that may form on them. Sheets of photographic material are normally inserted and withdrawn from the standard model one at a time. The sheets may be withdrawn with a finger or with the aid of a common print tong of the type found in most photographic laboratories.

The easy-unload model differs from the standard model in that in the easy-unload model all of the compartment partitions are connected together by two end plates so that they may all be lifted out of the washer together by grasping an attached handle. Lifting the partitions out will cause the sheets of photographic material to remain in the washer. The sheets may then be grasped with a hand and removed all at once. The sheets may also of course be removed one at a time in the same manner as with the standard model previously described.

All components of the washer are ideally made of a non-absorbing and non-corrosive material such as stainless steel or plastic. Ideally the structural parts of the washer should be made of a transparent plastic so as to permit the operator to easily see which compartments contain sheets of photographic material so as to facilitate the insertion and removal of the sheets. It should be noted that with present day acrylic plastic, which at present these washers are ideally made of, it is necessary to allow sufficient room in the partition grooves for the partitions to expand and it is also necessary that the partitions in the easy-unload model be suspended in the end plates, rather than be secured in a fixed way, so as to allow the partitions to expand both lengthwise and widthwise. Acrylic plastics tend to expand slightly upon their slight absorption of water, a process which may take months of constant submersion to complete. Also with the easy-unload model it is desirable to have a means of taking the partition assembly apart for cleaning purposes; to accomplish this end, one end plate of the partition assembly should be detachable, thus freeing the partitions.

Both the standard model and the easy-unload model can be made in any size or capacity desired to accommodate various sizes and numbers of sheets of photographic material.

Another form of the invention is especially designed for washing lengths of photographic material such as film rolls which have been mounted in any of the various types of spiral reels or other spiral separating devices such as are commonly used in photographic processing procedures. Heretofore washing tanks designed for washing photographic material mounted in reels or other spiral separating devices have been liable to produce uneven washing action because of water current patterns set up by the water input arrangements and/or have caused damage to soft photographic emulsions, especially soft color emulsions, due to the high velocity water jets inherent in their design because of the small number of water input openings. And, previous washer designs tended to splatter water about the room when first turned on with no water in them. Washer designs which incorporate aeration systems located at the base of the tank suffer from the likelihood of sucking in contaminated water which might be standing in a sink, draining out through the aerator air inputs when the water supply is shut off, and not being usable when submerged in a temperature control water jacket. These problems are caused by having the aerator air intakes below the water level of the operating washer. It is generally desirable to have aerators in photographic washing devices as the air bubbles thus produced create a constantly changing pattern of water agitation. It is desirable that the washer tank remain full after the water input supply has been cut off so that wetting agents and/or other baths may be added to the final wash water. If the washer should be used with an automatic water shut-off, it is necessary that the tank remain full of water or the photographic material will dry out on the reel or other spiral separating device unless the operator removes the photographic material immediately. It is also desirable that the tank remain full of liquid so that the tank may be used for other photographic processes, such as developing or fixing film. In such applications the water input may be used as an input for nitrogen or air burst agitation systems which are now becoming commonplace in many photographic laboratories.

In the present improvement, the photographic material, mounted on a spiral reel or other spiral separating device, is placed in a tank of approximately the same diameter as the reel (or several reels stacked on top of one another) or the spiral separating device. Water enters the tank at the bottom, passing through an aerator which adds air bubbles to the water stream. The air enters the aerator through a tube whose opening is above the water level of the tank when the tank is completely full. The air/water mixture then enters the bottom compartment of the washing tank where it passes through a partition containing a large number of small holes evenly distributed over the entire bottom area of the washing compartment of the tank. The air/water mixture rises in the tank, through the reels or other spiral separating device, and drains off the top of the tank, thereby washing the film with a rapidly changing supply of water which is subject to ever changing patterns of agitation by the air bubbles.

DESCRIPTION OF THE FIGURES

The specific nature of the invention, as well as other objects and advantages thereof, will clearly appear from a description of a preferred embodiment as shown in the accompanying drawings, in which:

FIG. 1 is a side perspective view of a print washer according to the invention;

FIG. 2 is a sectional view of the same washer taken on line 2—2 of FIG. 3;

FIG. 3 is a sectional view of the same washer taken on line 3—3 of FIG. 2;

FIG. 4 is a top view of the washer taken on line 4—4 of FIG. 2, but with the divider unit removed;

FIG. 5 is a sectional detail view taken on line 5—5 of FIG. 2;

FIG. 6 is an enlarged detail view of a portion of the basket unit;

FIG. 7 is a corner detail of the washer and basket;

FIG. 8 is a corner detail of one of the divider partition sheets;

FIG. 9 is a side view of the water inlet and aerator unit;

FIG. 10 is a top view of a corner of a simplified print washer;

FIG. 10A is a transverse sectional view of the print washer of FIG. 10 with a print hold-down in place;

FIG. 11 is a bottom view of the print hold-down shown in FIG. 10A;

FIG. 12 is a side view of a roll-film washer according to the invention; and

FIG. 13 is a top view of the film washer shown in FIG. 12.

As best shown in FIGS. 1 and 2, the easy-unload model of the washer is made in the form of a tank composed of sides 2 and 3 with ends 4 and 6. A compartment at the bottom of the tank, hereafter called the distribution manifold 8, is formed by a plate 9. This plate has a series of holes 11, which are so spaced as to be on alternate sides of the spaces set off by partitions 12 (FIG. 5). There are also a number of holes 13 at each end of the plate 9, which circulate water in the spaces formed between the ends of the tank 4 and 6 respectively, and the respective end pieces 14 and 16 of the partition assembly, when the partition assembly is in place in the washer. On both sides of the partitions 12, and on the interior sides 2 and 3 of the tank, are a number of ribs 17, spaced at regular intervals, which serve to keep the sheets of photographic material away from the surfaces of the partitions 12, and the sides of the tank 2 and 4. In the space between each two ribs, there are two or more holes 11, in plate 9, with one or more holes directed to each side of the compartment.

The partitions 12 are held in place by the end plates 14 and 16, into which a groove 17 has been cut to hold each partition (FIG. 8). To keep the partitions from sliding out when the partition assembly is lifted, ears 18 (FIGS. 6 and 8) on the partitions fit into slots 19 of the assembly end plates 14 and 16. The slots 19 are long enough to permit the partitions 12 to have sufficient play, up and down, so as to individually rest on the manifold plate 9 when the partition assembly is in place in the washer. This effects a water seal and prevents lateral contamination between the various compartments. One of the end plates, e.g. 16 is firmly attached to a center partition 21, and the other end plate 14 may be attached to the center partition 21 by removable screws 22, or some other means that will permit the assembly to be taken apart for cleaning purposes. Near the top of each partition assembly end plate 14 and 16 are drainage slots 23, which are set at a slightly higher level than corresponding drainage slots 24, on the ends 4 and 6 of the washing tank. The center partition 21, or other suitable partition of the partition assembly, is preferably made of a thicker material than the other partions and is firmly attached to both the partition assembly and plates 14 and 16 as above described so as to provide stability to the assembly. This center partion 21 should have an extension at its top which forms a handle 26 which is used to lift the assembly out of the washer tank.

The edges of the partition assembly end plates 14 and 16 engage grooves 27 in the sides of the washing tank 2 and 3 to guide the partition assembly when it is inserted into the washing tank and to keep it in the proper position during operation and to effect a water seal of the two outside compartments of the washer.

Water enters the washer at the bottom through an aerator assembly 28 (FIG. 9), into which the air supply enters through air intake tube 29 which terminates above the water level of the washer when it is operating. This arrangement prevents the washer from draining itself when the water input supply is turned off, prevents contaminated water that may be standing in the sink from being sucked into the aerator, and permits the aerator to function when the washer is submerged in a water jacket for temperature control purposes. Use of the air intake tube 29 allows the aerator 28 to be at the bottom of the washer tank, thus keeping the hose or water supply pipe at a low level and out of the operator's way.

A simpler and less expensive model of the washer for sheets of photographic materials is shown in FIG. 10, and is in most respects the same as the aforementioned easy-unload model, similar reference characters with a prime (') added being used for corresponding parts in FIG. 11 with the following exceptions: The partitions 12' fit into grooves 31 which are cut directly into the ends of the washer tank 4' and 6'. This model does not have the partition assembly with end plates 14 and 16 nor handle 26 as does the easy-unload model first described. Sheets of photographic material are inserted and removed one at a time with this simpler model. The partitions 12' are normally left in place in the washer except when they are removed for cleaning purposes. As the partitions 12' are normally left in place and there is no partitions assembly, the partitions do not have ears 18 as do the partitions in the easy-unload model.

It will be noted in FIGS. 3 and 5 that the perforations 11 are slanted, which aids in directing the stream between a print resting against the ribs 17 and the partition and also aids in providing a swirling or turbulent motion to the washing fluid, which increases its effectiveness.

FIGS. 12 and 13 show the film washing tank adapted to washing photographic material mounted on reels or other spiral separating devices. The tank column 41 is mounted on a base 42. The size of this tank is of course related to the diameter and number of reels that it is desired to wash at one time. All parts of the washer are preferably made of a non-corrosive material such as plastic or stainless steel. The tank column 41 is divided by a partition or septum 43 into compartments 44 and 46. This partition contains a large number of holes 47 spaced evenly over its entire surface. The size and number of the holes is such that the water emerging from them is at a low velocity so that it does not damage soft photographic emulsions. The diameter of the holes should be small enough to produce bubbles small enough to pass through the openings in the reels used in the washer. There should be a sufficient number of holes to cause the air/water mixture to be evenly distributed over the entire base of the tank.

Air enters the aerator 48 through tube 49 above the overflow level of the tank, which prevents the washer from draining itself through the aerator air input when the water supply is shut off. This arrangement also prevents the aerator from sucking in contaminated water which may be standing in the sink. Having the air enter the aerator through tube 49 at a point above the level of the water also allows the aerator to function in a water jacket as is commonly employed to control temperature, especially in color processing. Tube 49 can easily be plugged if it is desired to use the washer as a chemical processor with the water input being used as the input for nitrogen or air burst agitation systems.

Some types of photographic sheet materials tend to float when placed in water. Thus, provided with each washer are one or more toothed devices functioning as print hold-downs to keep the sheets submerged. These devices can be made in either of two forms, one of which consists of a bar of solid material with teeth cut into one edge of the bar and so spaced that the teeth will extend down into each compartment when the bar is placed on the top of the washer. These toothed extensions place pressure on the top edge of the sheet of photographic material and keep the sheet below the level of water in the washer.

The alternate form of print hold-downs shown in FIGS. 10A and 11 consists of two toothed bars 33 and 34, similar in design to the one previously referred to, secured side-by-side in such a way that they may be displaced end-to-end in such a way that the teeth of one bar will press against the first sides of the compartment partitions, and the teeth of the second bar shall press against the other sides of the compartment partitions. The adjustment can be made by sliding handles 35 and 36 in slots 37 and 38 to the proper amount, then tightening the handles on their screws 35' and 36' respectively. Alternatively a spring may be employed to cause the displacement of the two toothed bars. This arrangement will cause the teeth to fill all the space between the compartment partitions thus preventing thin sheets of photographic material from rising between the teeth and the compartment partitions. It is not possible to make the bar teeth the full dimension of the width of the compartments as it would then be difficult to place the toothed bar over all the partitions due to the slight variance in widths between the compartments due to warping of the partition materials, or other difficulties.

The aerator 28 is shown in FIG. 9, wherein the water flow is represented by $a$ and the air flow by $b$. It is preferably made of clear plastic so that its proper action can be readily checked.

It will be understood that the invention is not limited to the exact embodiment shown and that various modifications can be made in construction and arrangement within the scope of the invention.

I claim:

1. a. A washer for washing photographic material in sheet form comprising
   b. a tank having a pair of rectangular parallel vertical side and end walls and a horizontal bottom wall,
   c. a horizontal septum within said tank parallel to and spaced from said bottom wall to provide between itself and said bottom wall a single fluid distribution manifold, said septum being perforated with a large number of spaced small perforations over substantially its entire area,
   d. fluid supply means for supplying to said manifold a continuous stream of water under a pressure sufficient for said stream to rise through said perforations to the top of said tank and to overflow said tank,
   e. a number of narrowly spaced partitions parallel to said side walls and extending down into engagement with said septum to provide separate compartments for respectively holding upright a single sheet of photographic material in each compartment, each of said partitions providing a fluid-tight compartment against lateral contamination of fluid from adjacent compartments and open to said distribution manifold only through said small perforations, f. said fluid supply means comprising a single water inlet tube means at the bottom of said tank for supplying water to all of said compartments,
g. overflow outlet means near the top of said end walls for discharging fluid under continuous flow in said fluid supply means and through said compartments,
h. said partitions extending higher than said overflow outlet means to prevent fluid from one compartment from mixing with fluid from another compartment prior to discharge through said overflow means,
i. said fluid supply means including an aerator for mixing with said continuous stream of water bubbles of entrained air, said aerator having an air inlet tube rising from said water inlet tube means to above the overflow level of the tank to prevent the washer from draining when the water supply is shut off.

2. The invention according to claim 1,
and a series of projections extending inwardly from the side walls of said compartments to hold print sheets away from direct contact with said side walls.

3. The invention according to claim 2,
said projections being in the form of a series of vertical ribs.

4. The invention according to claim 3,
there being at least one of said perforations of the septum between each pair of adjacent vertical ribs to insure passage of fluid at all points between a sheet being washed and the compartment walls.

5. The invention according to claim 1,
said perforations being slanted away from the vertical in alternate directions so as to impart a horizontal swirling component of motion to fluid passing from the manifold into the washing chamber of the tank, and direct the fluid to both sides of a sheet of photographic material contained in the washing chamber.

6. The invention according to claim 1,
and a print hold-down device comprising a transverse member lying across the tops of all of said partitions and having projecting teeth extending downwardly into the compartments to maintain the top edges of contained sheets below the overflow level.

7. The invention according to claim 6,
said transverse member including two similar toothed elements shiftable longitudinally to conform to the width of the compartment spaces.

8. The invention according to claim 7,
and screw means to retain said toothed elements in an adjusted relative position.

* * * * *